Feb. 9, 1937.   W. A. DUFFIELD   2,070,262
AUTOMATIC POWER TRANSMISSION
Filed Dec. 20, 1935   2 Sheets-Sheet 1

INVENTOR
William A. Duffield
BY
ATTORNEY

Patented Feb. 9, 1937

2,070,262

UNITED STATES PATENT OFFICE 2,070,262

AUTOMATIC POWER TRANSMISSION

William A. Duffield, Montreal, Quebec, Canada, assignor to Juno Corporation Limited, Montreal, Quebec, Canada, an incorporated company Application December 20, 1935, Serial No. 55,358

8 Claims. (Cl. 74—293)

This invention relates to the variable transmission of power and particularly to mechanism including a fluid clutch of the Fottinger type, adapted to provide an automatic operation suitable for motor vehicles and the like.

The object of the invention is to provide an improved automatic variable speed transmission in which the power absorbed by its operation at all variations of speed is reduced to a minimum and is used with the greatest efficiency.

A further object is to provide a transmission of this type in which the planetary gear embodied in it, is employed in a reverse drive by simple compact and highly efficient means.

A further object is to provide a transmission mechanism including a fluid clutch, with an oil circulating system whereby the fluid clutch is filled and emptied of oil when required, and the whole mechanism kept thoroughly lubricated.

This application is related to my pending application Serial No. 32,939 filed July 24, 1935, and includes improvements and additions to the invention therein set forth and claimed.

In the present invention the power from the drive shaft is first acted on by the reduction gear and the power required to drive the fluid clutch is taken from the driven shaft. By this means a greater amount of available effective power is secured, and loss of power avoided.

The invention consists briefly in a drive shaft, planetary reduction gears, a driven shaft on which a fluid clutch is mounted, one member of which is secured to the carrier of the gears. It also includes the reverse attachment to the gears, an oil feed to the fluid clutch, and a lubrication system.

Reference is made to the accompanying drawings in which:—

Figure 1:
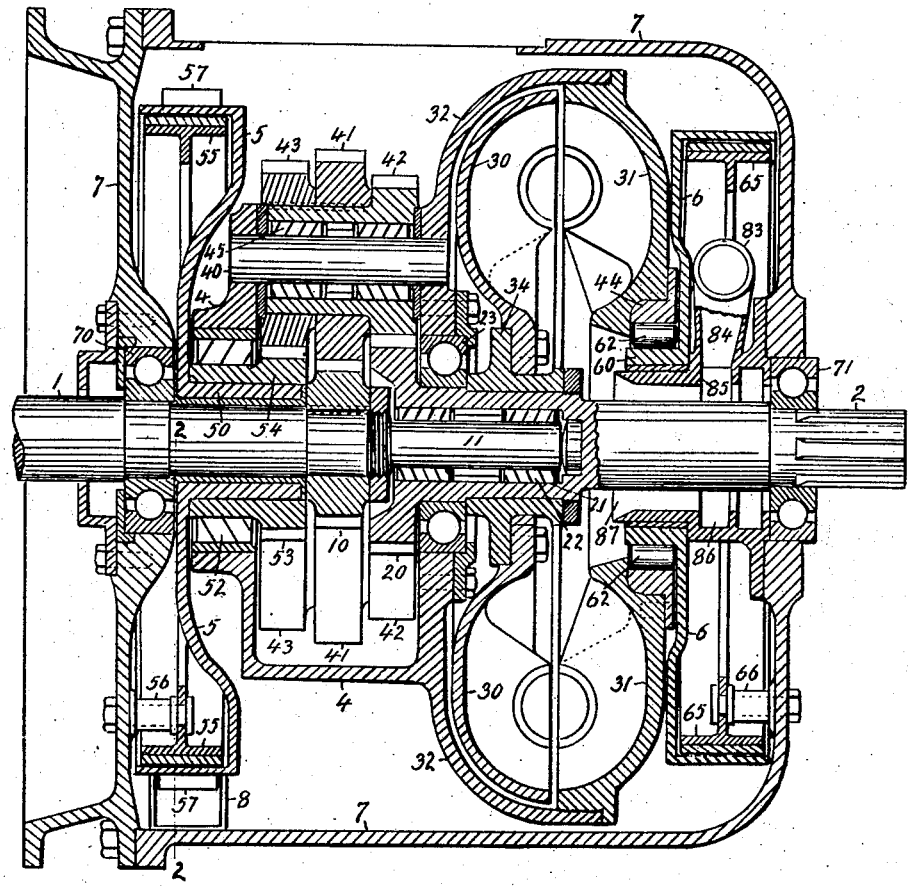
Figure 1 is a vertical longitudinal section of the invention in one form in which it has been developed.
Figure 2:
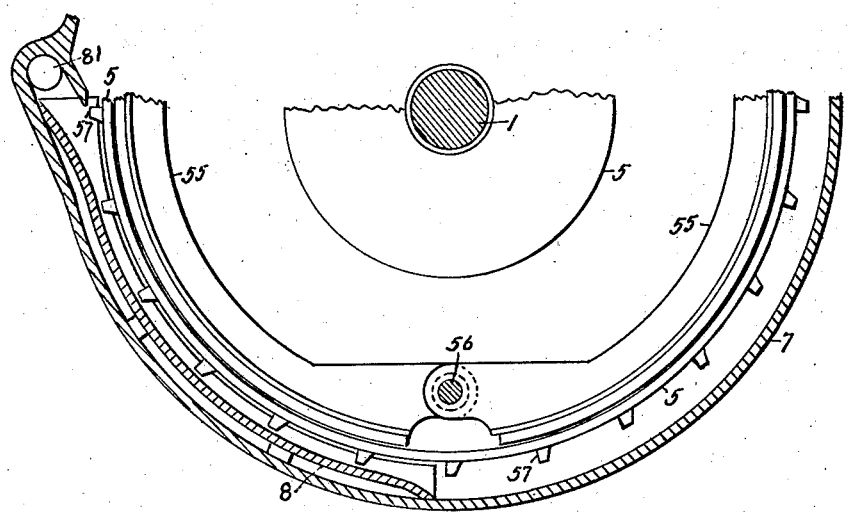
Figure 2 is a vertical cross section on the line 2—2 of Fig. 1.
Figure 3:
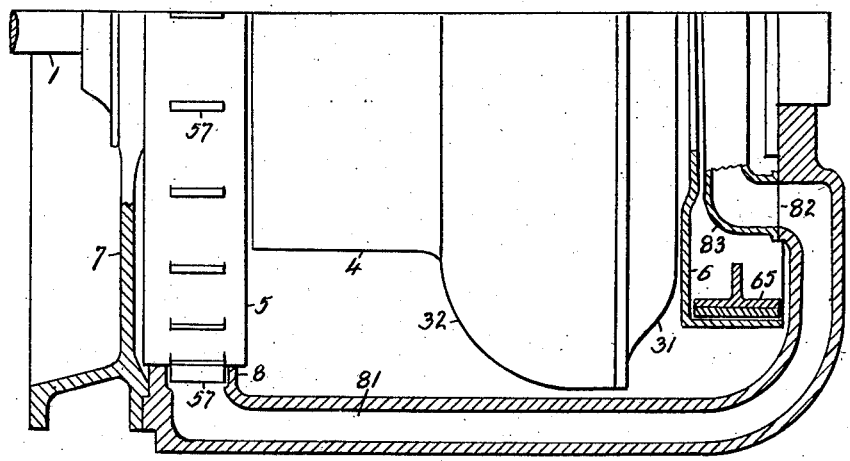
Figure 3 is a view from above with casing removed, of one half of the mechanism, partly in cross section.

Referring to Figure 1.

The main shaft 1 which is coupled by the usual clutch to the crank shaft of the prime mover (not shown) is journalled in bearings 70 in the end of the casing 7.

The shaft 1 has a pinion 10 keyed to it and beyond this an extension 11 of reduced diameter.

The tail shaft 2 is journalled in bearings 71 in the other end of the casing 7, and has a bore 21 with bearings 22 to journal the extension 11 of the shaft 1. The shaft 2 has a pinion 20 adjacent the pinion 10. A carrier 4 journalled on bearings 52 and 23, carries a series of pins 40 parallel to the axis of the shafts 1 and 2 with bearings 45 on which are journalled triple planetary gears 41, 42 and 43.

Each set of these triple gears 41, 42 and 43 are keyed together to form an integral body.

The large center gear 41 meshes with the pinion 10 on the shaft 1.

The small gear 42 meshes with the pinion 20 on the tail shaft 2.

The intermediate gear 43 meshes with a pinion 53 on a sleeve 54 which is journalled in the bearing 52.

The sleeve 54 is keyed to a sleeve 50 journalled on the shaft 1.

From the sleeve 50 extends a brake drum 5.

Extending from the carrier 4 is a bowl shaped housing 32 surrounding the driver 30 of a fluid clutch, and secured to the outer edge of the runner 31.

The runner 31 is secured to a ring 44 which carries an over running clutch 62.

The driver 30 is bolted to the flanged sleeve 34 which is keyed to the tail shaft 2.

The overrunning clutch 62 bears on the sleeve 60 of the brake drum 6.

The sleeve 60 is journalled on a tubular extension 85 which is secured to the casing 7.

The brake drum 5 is controlled by an internal expanding shoe 55 pivoted at 56 on the casing 7.

The brake drum 6 is controlled by an internal expanding shoe 65 pivoted at 66 to the casing 7.

On the outer surface of the drum 5 are a series of spaced vanes 57 which travel in a stationary trough 8.

The trough 8 has an opening into a pipe 81 which passes along the side of the casing 7 and around the end to an inlet 82 and connects with a pipe 83.

Secured to the end of the casing 7 is a cylindrical casting 85 which surrounds the shaft 2.

This casting 85 has an internal groove 86 and a passage 87.

The casting 85 also has a connection 84 between the pipe 83 and the groove 86.

The passage 87 opens into the entrances of the driver 30 and runner 31.

The type of pump shown can be replaced by other types of pumps combined with the transmission mechanism to return the oil from the bottom of the casing to the fluid coupling.

The operation of the transmission is as follows:—

With this construction it will be seen that the drive of the shaft 1 while the carrier 4 is at rest, will be through pinion 10, gear 41, gear 42, pinion 20 to tail shaft 2, and thereby producing the reduction effected by the gears.

As the tail shaft 2 rotates it carries with it the member 30 of the fluid coupling 3 at the reduced speed.

As the load on the tail shaft 2 is picked up and the speed of rotation of the member 30 increases, it gradually couples with the member 31 as the slip between them decreases.

When the member 31 begins to rotate it carries with it the carrier 4. The rotation of the carrier 4 lessens the reduction effect of its gears and increases the speed of rotation of the tail shaft 2, until finally the drive from the shaft 1 to the shaft 2 is practically direct. When the load increases or the vehicle is slowed down by its brakes the reverse operation takes place and the reduction gear is automatically cut in smoothly and without strain.

Every variation of drive speed is thus provided for by the mechanism, without any manual gear changing.

In starting, the overrunning clutch 62 prevents the carrier from reverse rotation. But when the carrier is being driven by the fluid coupling the overrunning clutch can be released.

In order to reverse the drive of the tail shaft, the overrunning clutch is released to permit the carrier to change the direction of its rotation.

The pinion 53 is held stationary by the shoe 55 on the brake drum 5. The drive of the pinion 10 on the gear 41 causes the integral gears 43, 41 and 42 to travel around their pinions, driving the carrier in reverse rotation. But as the small gear 42 takes longer to complete a circuit of the tail shaft pinion 20 than the gear 43 takes to travel around the stationary pinion 53, the pinion 20 and the tail shaft 2 are driven in reverse rotation. This reverse drive is at low speed as is required.

The casing 7 is partially filled with oil.

When the drum 5 is rotated by the pinion 53, the vanes 57, pump oil into the pipe 81 and thence through the passage 81 into the fluid coupling 30—31.

When the fluid coupling is filled the oil continues to flow into the gearing which it lubricates and thence back into the casing 7.

As the oil pump is operated by the reverse mechanism, when this is held for reverse drive there will be no pumping action and the oil will leave the fluid coupling and return to the casing. This will practically cut out the fluid coupling and reduce any resistance from it during the reverse drive. As soon as the forward drive starts the fluid coupling will be filled with oil.

What I claim is:—

1. In an automatic power transmission, a casing, a fluid coupling of the Fottinger type having a driver and a runner, a power driven shaft a tail shaft, journalling the driven shaft, both shafts journalled in the casing, adjacent pinions on the shafts, a carrier journalled about the shafts, integral gears journalled on the carrier, two sets of which mesh with the pinions, a brake drum keyed to a sleeve journalled on the driven shaft having a pinion meshing with the third set of gears, the driver of the fluid coupling keyed to the tail shaft, the runner connected by a housing to the carrier, an overrunning clutch connected to the runner, a brake control connected to this clutch.

2. In an automatic power transmission, a casing, a fluid coupling of the Fottinger type having a driver and a runner, a power driven shaft, a tail shaft, journalling the driven shaft, both shafts journalled in the casing, adjacent pinions on the shafts, a carrier journalled about the shafts, integral gears journalled on the carrier, two sets of which mesh with the pinions, a brake drum keyed to a sleeve journalled on the driven shaft having a pinion meshing with the third set of gears, the driver of the fluid coupling keyed to the tail shaft, the runner connected by a housing to the carrier, an overrunning clutch connected to the runner, a brake control connected to this clutch, means to fill and empty the fluid coupling of oil.

3. In an automatic power transmission, a casing, a fluid coupling of the Fottinger type having a driver and a runner, a power driven shaft, a tail shaft journalled axially therewith, both shafts journalled in the casing, pinions on each shaft, a carrier journalled about the shafts, integral gears journalled on the carrier parallel to the shafts meshing with the pinions, one member of the coupling secured to the tail shaft, the other member secured to the carrier, an overrunning clutch connected to this member, means to release this clutch, a passage from the casing to the interior of the fluid coupling and a pump in the casing adapted to carry oil from the bottom of the casing into the fluid coupling.

4. In an automatic power transmission, a casing, a fluid coupling of the Fottinger type having a driver and a runner, a power driven shaft, a tail shaft journalled axially therewith, both shafts journalled in the casing, pinions on each shaft, a carrier journalled about the shafts, integral gears journalled on the carrier parallel to the shafts meshing with the pinions, one member of the coupling secured to the tail shaft, the other member secured to the carrier, an overrunning clutch connected to this member, means to release this clutch, a passage from the casing to the interior of the fluid coupling and a pump in the casing operated by the transmission mechanism adapted to force oil from the bottom of the casing through the passage into the fluid coupling.

5. In an automatic power transmission, a casing, a fluid coupling of the Fottinger type having a driver and a runner, a power driven shaft, a tail shaft journalled axially therewith, both shafts journalled in the casing, pinions on each shaft, a carrier journalled about the shafts, integral gears journalled on the carrier parallel to the shafts meshing with the pinions, one member of the coupling secured to the tail shaft, the other member secured to the carrier, an overrunning clutch connected to this member, means to release this clutch, a third gear integral with the other gears, meshing with a pinion on a sleeve journalled on the driven shaft, a brake drum keyed to this sleeve, internal shoes pivoted in the casing adapted to hold the drum, a series of vanes projecting from the drum, a trough covering the vanes on the drum secured to the casing extending from the bottom of the casing to an outlet in the side of the casing, a passage from the outlet to the interior of the fluid coupling.

6. In an automatic power transmission, a casing, a fluid coupling of the Fottinger type having a driver and a runner, a power driven shaft, a tail shaft, the driven shaft journalled in a bore in the tail shaft, the shafts journalled axially in the casing, adjacent pinions on the shafts, a carrier journalled about the shafts, triple integral gears journalled on the carrier, the driver of the fluid coupling secured to the tail shaft, the runner connected to the carrier, an overrunning clutch connected to the runner, a brake control connected to this clutch, a sleeve having a pinion, keyed to a reverse brake mechanism, journalled on the driven shaft, the gears meshing with the three pinions, the members of the coupling open centrally, an oil pump in the casing, operated by the gearing, a passage from the pumps to the interior of the fluid coupling.

7. In an automatic power transmission, a casing, a fluid coupling of the Fottinger type having a driver and a runner, a power driven shaft, a tail shaft, the driven shaft journalled in a bore in the tail shaft, the shafts journalled axially in the casing, adjacent pinions on the shafts, a carrier journalled about the shafts, triple integral gears journalled on the carrier, the driver of the fluid coupling secured to the tail shaft, the runner connected to the carrier, an overrunning clutch connected to the runner, a brake control connected to this clutch, a sleeve having a pinion, keyed to a reverse brake mechanism, journalled on the driven shaft, the gears meshing with the three pinions, the members of the coupling open centrally, an oil pump in the casing operated by the reverse brake mechanism, and a passage from the pump to the interior of the fluid coupling.

8. In an automatic power transmission, a casing, a fluid coupling of the Fottinger type having a driver and a runner, a power driven shaft, a tail shaft, the driven shaft journalled in a bore in the tail shaft, the shafts journalled axially in the casing, adjacent pinions on the shafts, a carrier journalled about the shafts, triple integral gears journalled on the carrier, the driver of the fluid coupling secured to the tail shaft, the runner connected to the carrier, an overrunning clutch connected to the runner, a brake control connected to this clutch, a sleeve having a pinion, keyed to a reverse brake mechanism, journalled on the driven shaft, the gears meshing with the three pinions, the members of the coupling open centrally, an oil pump in the casing, operated by the gearing, a passage from the pump to the interior of the fluid coupling, an oil pump in the casing comprising vanes on the drum of the reverse brake mechanism, a trough over the vanes from the bottom of the casing to an outlet in the side of the casing and a passage from the outlet to the interior of the fluid coupling.

WILLIAM A. DUFFIELD.